(12) United States Patent
Ashley (10) Patent No.: US 10,064,326 B1
(45) Date of Patent: Sep. 4, 2018

(54) PLOW AND FERTILIZER APPARATUS

(71) Applicant: Samuel D. Ashley, Oak Grove, LA (US)

(72) Inventor: Samuel D. Ashley, Oak Grove, LA (US)

( * ) Notice: Subject to any disclaimer, the term of this patent is extended or adjusted under 35 U.S.C. 154(b) by 132 days.

(21) Appl. No.: 15/079,150

(22) Filed: Mar. 24, 2016

(51) Int. Cl.
*A01C 5/06* (2006.01)
*A01C 23/04* (2006.01)

(52) U.S. Cl.
CPC ............ *A01C 23/047* (2013.01); *A01C 5/064* (2013.01)

(58) Field of Classification Search
CPC ........... A01C 5/064; A01C 5/062; A01C 5/06; A01C 5/00; A01C 23/047; A01C 23/04; A01C 23/00
See application file for complete search history.

(56) References Cited

U.S. PATENT DOCUMENTS

| | | | |
|---|---|---|---|
| 3,834,330 A | 9/1974 | Wallace | |
| 3,990,662 A | 11/1976 | Wallace | |
| 4,445,445 A | 5/1984 | Sterrett | |
| 5,240,080 A | 8/1993 | Bassett et al. | |
| 5,271,342 A | 12/1993 | Neidhardt | |
| 5,495,814 A | 3/1996 | Primus | |
| 6,178,900 B1 | 1/2001 | Dietrich, Sr. | |
| 6,986,314 B2 | 1/2006 | Linnebur et al. | |
| 7,152,539 B2 | 12/2006 | Swanson | |
| 8,220,559 B2 | 7/2012 | Ryan | |
| 8,646,395 B2 | 2/2014 | Schilling et al. | |

*Primary Examiner* — Christopher J Novosad
(74) *Attorney, Agent, or Firm* — R. Keith Harrison (57) ABSTRACT

A plow and fertilizer apparatus includes an elongated main apparatus beam; a plurality of furrow plow assemblies carried by the main apparatus beam, each of the plurality of furrow plow assemblies including a furrow plow arm carried by the main apparatus beam; and a furrow plow blade carried by the furrow plow arm; an elongated coulter assembly mount beam carried by the main apparatus beam; and a plurality of fertilizer coulter assemblies carried by the coulter assembly mount beam in generally aligned or registering relationship to the plurality of furrow plow assemblies, respectively, each of the plurality of fertilizer coulter assemblies including a coulter assembly arm carried by the coulter assembly mount beam; and at least one coulter disk carried by the coulter assembly arm; a plurality of fertilizer discharge tubes carried by the plurality of fertilizer coulter assemblies, respectively; and at least one fertilizer distribution tube disposed in fluid communication with the plurality of fertilizer discharge tubes.

20 Claims, 8 Drawing Sheets

PLOW AND FERTILIZER APPARATUS

FIELD

Illustrative embodiments of the disclosure generally relate to apparatuses and methods for forming furrows in the ground and dispensing fertilizer into the furrows for subsequent planting in farming applications. More particularly, illustrative embodiments of the disclosure generally relate to a plow and fertilizer apparatus having multiple fertilizer coulter assemblies and multiple furrow plow assemblies which form multiple furrows and fertilize the furrows, respectively, in a single operation.

SUMMARY

Illustrative embodiments of the disclosure are generally directed to a plow and fertilizer apparatus having multiple fertilizer coulter assemblies and multiple furrow plow assemblies which form multiple furrows and fertilize the furrows, respectively, in a single operation. An illustrative embodiment of the plow and fertilizer apparatus includes an elongated main apparatus beam; a plurality of furrow plow assemblies carried by the main apparatus beam, each of the plurality of furrow plow assemblies including a furrow plow arm carried by the main apparatus beam; and a furrow plow blade carried by the furrow plow arm; an elongated coulter assembly mount beam carried by the main apparatus beam; and a plurality of fertilizer coulter assemblies carried by the coulter assembly mount beam in generally aligned or registering relationship to the plurality of furrow plow assemblies, respectively, each of the plurality of fertilizer coulter assemblies including a coulter assembly arm carried by the coulter assembly mount beam; and at least one coulter disk carried by the coulter assembly arm; a plurality of fertilizer discharge tubes carried by the plurality of fertilizer coulter assemblies, respectively; and at least one fertilizer distribution tube disposed in fluid communication with the plurality of fertilizer discharge tubes.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. As used herein, relative terms such as "front", "rear", "upper" and "lower" are intended to be used in an illustrative and not a limiting sense. In some applications, therefore, those elements which are identified as "upper" may be located beneath those elements which are identified as "lower" in the following detailed description. For purposes of description herein, such relative terms shall relate to the position of the plow and fertilizer assembly as illustrated in FIG. 1.

Figure 1:
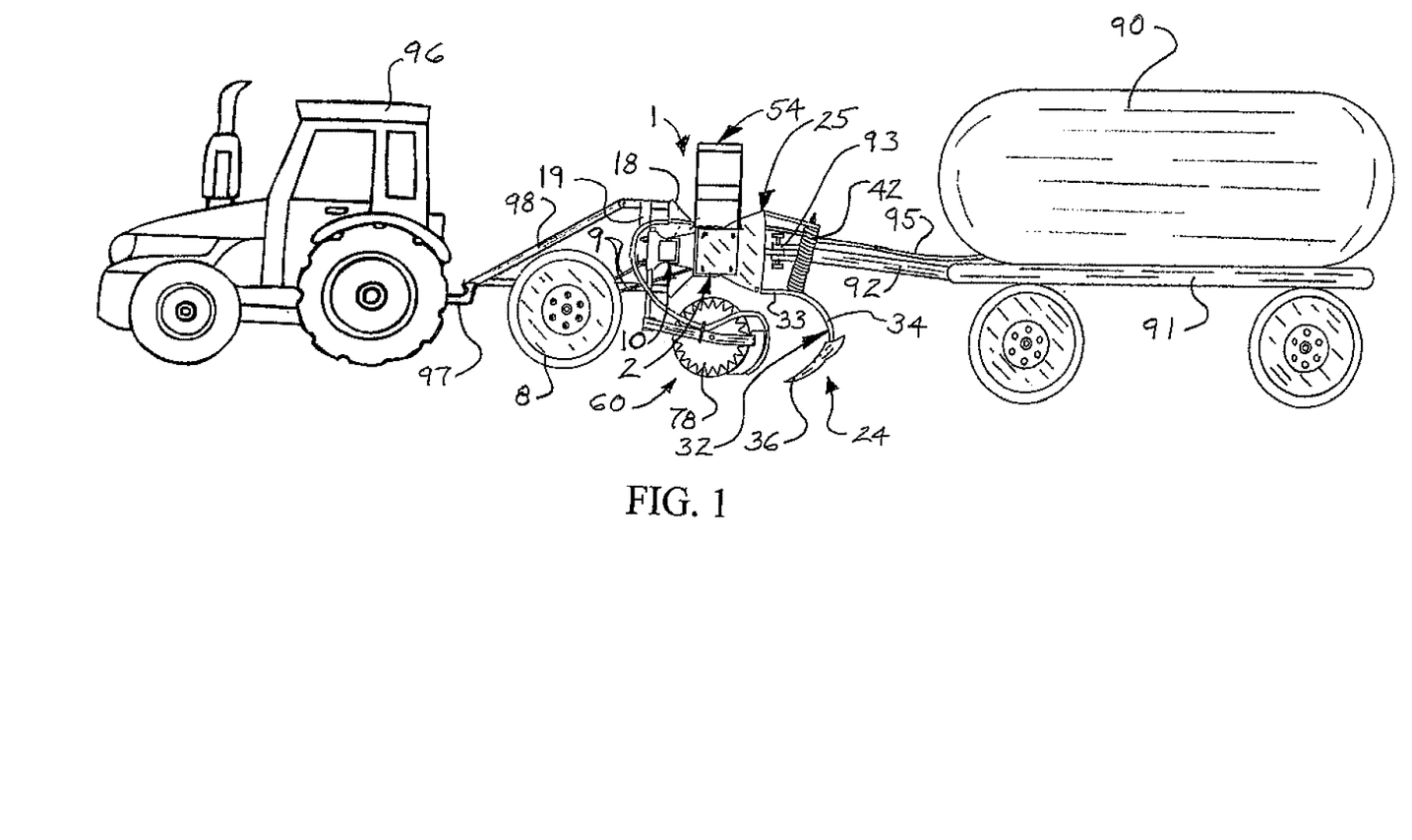
FIG. 1 is a side view of an illustrative embodiment of the plow and fertilizer apparatus, coupled to a towing tractor with a fertilizer tank trailer carrying a fertilizer tank and coupled to the plow and fertilizer apparatus.
Figure 11:
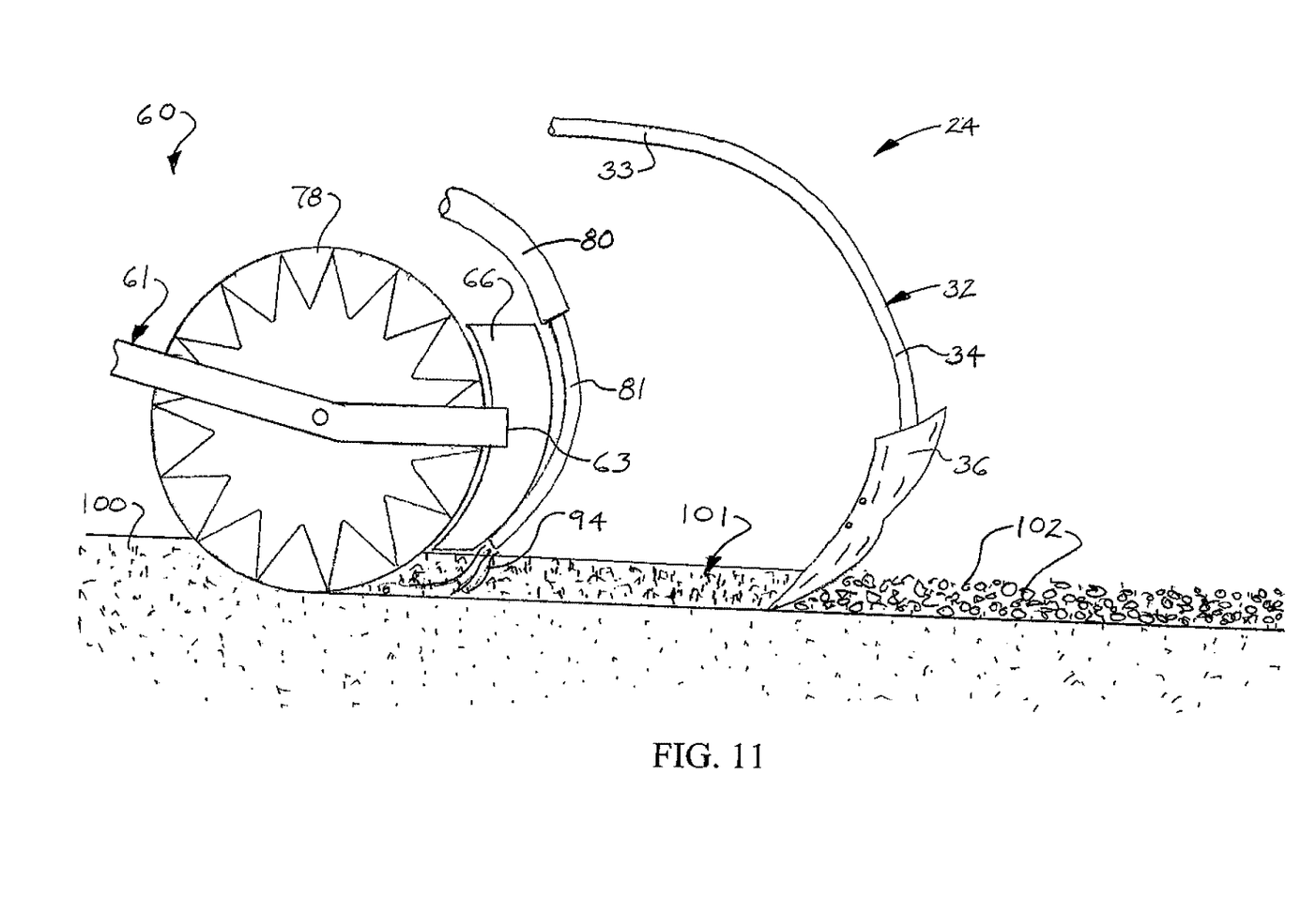
FIG. 11 is a side view, partially in section, of a coulter disk and a furrow plow blade with the coulter disk forming a furrow in soil and the furrow plow blade forming plowed soil in the furrow behind the coulter disk as the apparatus is towed and fertilizer is dispensed from a fertilizer discharge tube behind the coulter disk into the furrow in typical application of the plow and fertilizer apparatus.

Referring initially to FIGS. 1 and 11 of the drawings, an illustrative embodiment of a plow and fertilizer apparatus is generally indicated by reference numeral 1. In typical application, which will be hereinafter described, the plow and fertilizer apparatus 1 is coupled to a tractor hitch 97 on a towing tractor 96. A fertilizer tank 90, mounted on a wheeled fertilizer tank trailer 91, is coupled to the plow and fertilizer apparatus 1. The plow and fertilizer apparatus 1 includes an elongated main apparatus beam 2. Multiple furrow plow assemblies 24 are mounted in adjacent relationship to each other along the main apparatus beam 2. An elongated coulter assembly mount beam 10 is mounted to and disposed in front of the main apparatus beam 2. Multiple fertilizer coulter assemblies 60 are mounted on the coulter assembly mount beam 10 in adjacent relationship to each other and in front of and in substantially aligned or registering relationship to the respective furrow plow assemblies 24. Accordingly, as the tractor 96 tows the plow and fertilizer apparatus 1 and the fertilizer tank trailer 91 carrying the fertilizer tank 90, the fertilizer coulter assemblies 60 form furrows 101 (FIG. 11) in the soil 100. Fertilizer 94 is dispensed into the furrow 101 which is formed by each fertilizer coulter assembly 60. Each furrow plow assembly 24 subsequently breaks up, oxygenates and mixes the soil 100 with the fertilizer 94, leaving plowed soil 102 which is mixed with the fertilizer 94 in the furrows 101. Combining the multiple furrow plow assemblies 24 with the respective fertilizer coulter assemblies 60 in the single plow and fertilizer apparatus 1 may expedite plowing, fertilizing and planting in farming applications by combining the plowing and fertilizing operations into a single operation.

Figure 3:
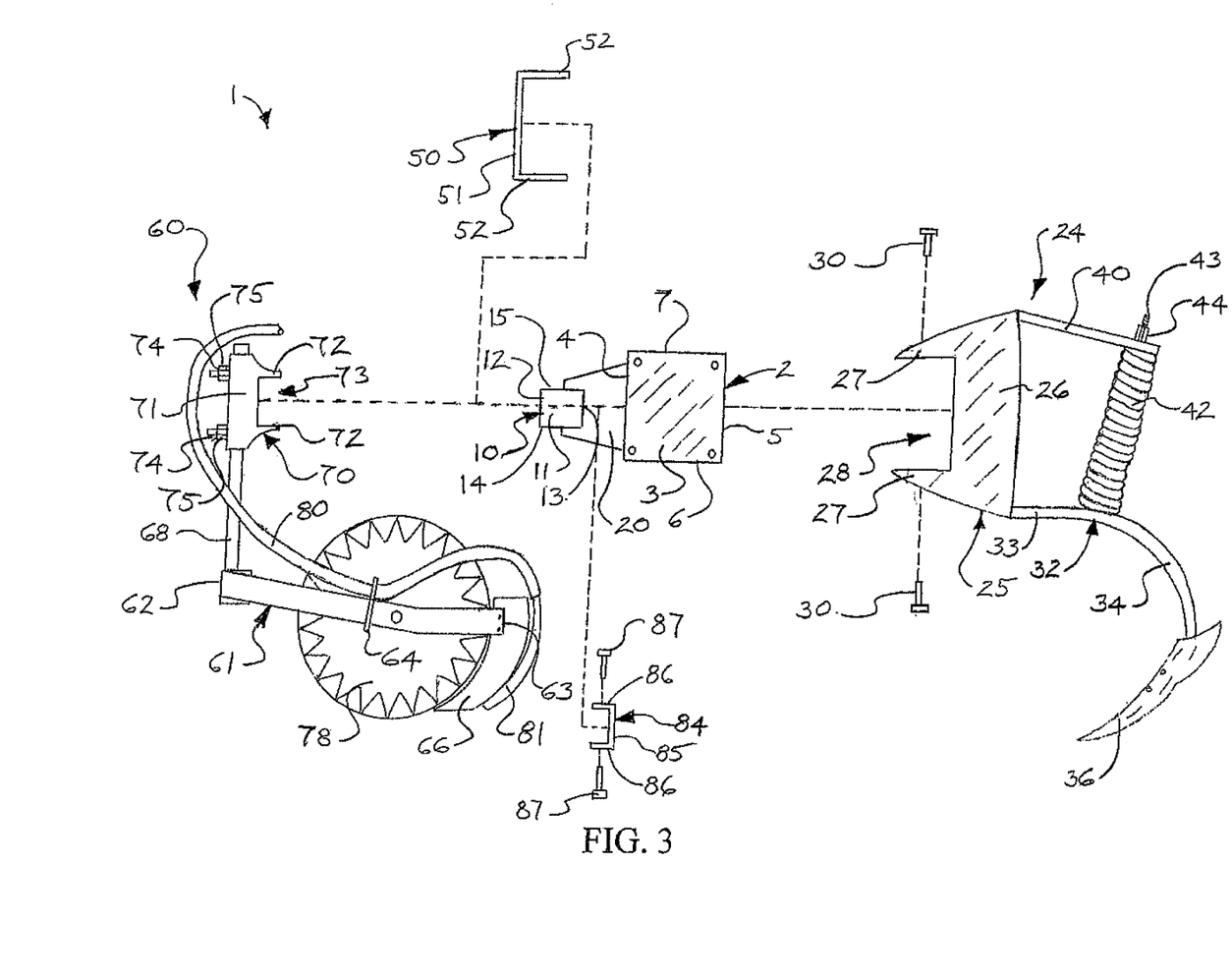
FIG. 3 is an exploded side view of an illustrative plow and fertilizer apparatus.
Figure 4:
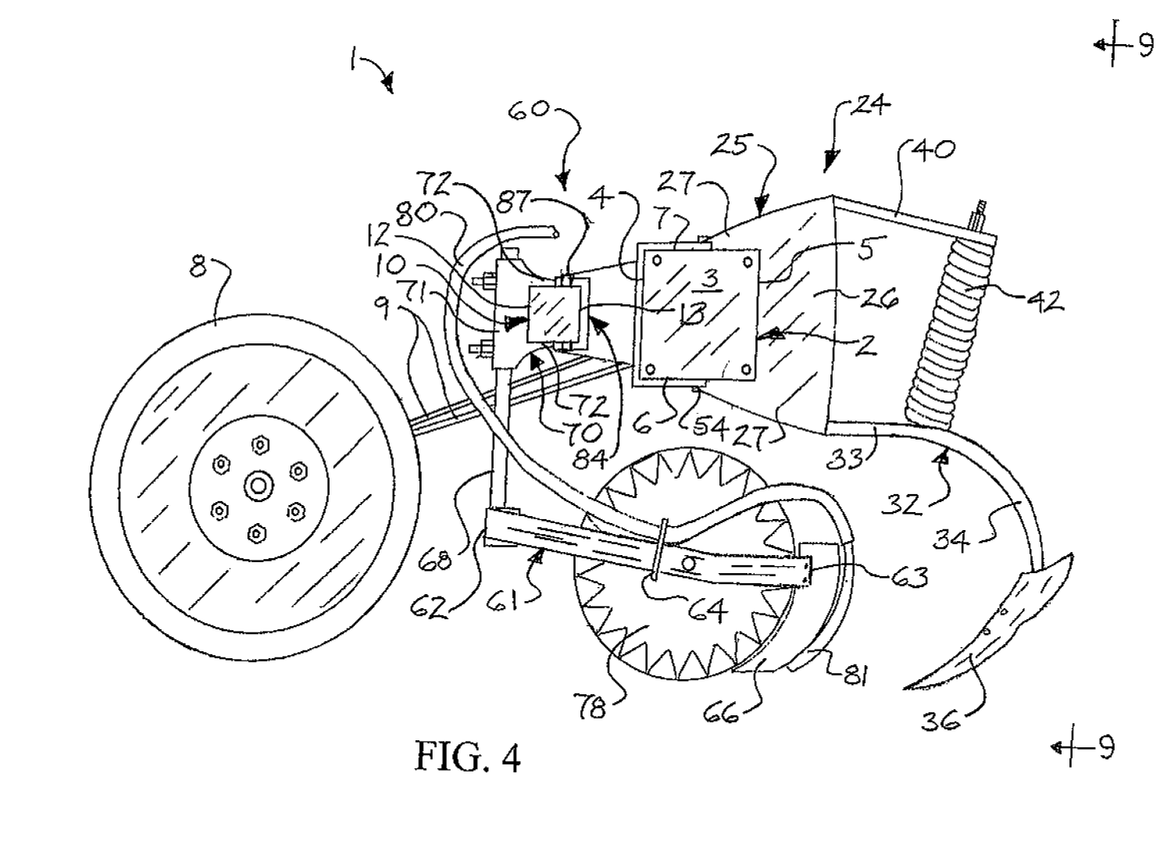
FIG. 4 is a side view of an illustrative assembled plow and fertilizer apparatus.
Figure 8:
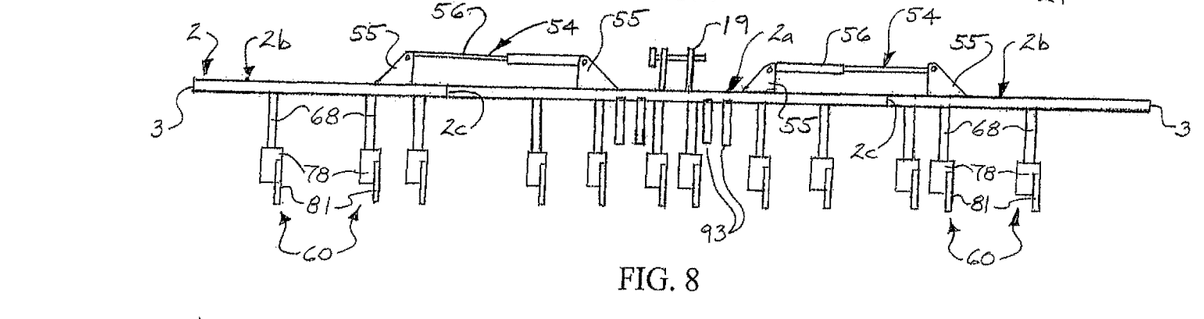
FIG. 8 is a rear view of multiple fertilizer coulter assemblies mounted on the coulter assembly mount beam (not illustrated) in front of the main apparatus beam of an illustrative plow and fertilizer apparatus, with the furrow plow assemblies (not illustrated) detached from the apparatus.
Figure 9:
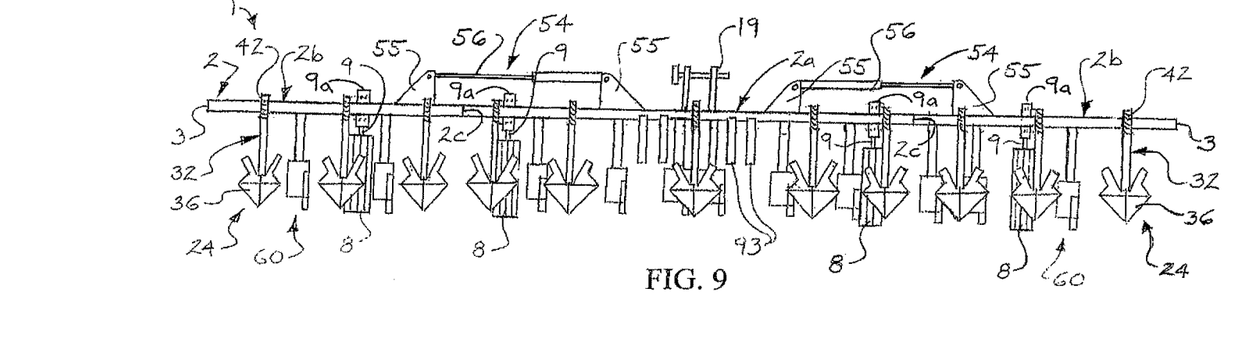
FIG. 9 is a rear view of an illustrative plow and fertilizer apparatus, with multiple fertilizer coulter assemblies mounted on the main apparatus beam and multiple furrow plow assemblies mounted on the coulter assembly mount beam (not illustrated) in front of the main apparatus beam.
Figure 10:
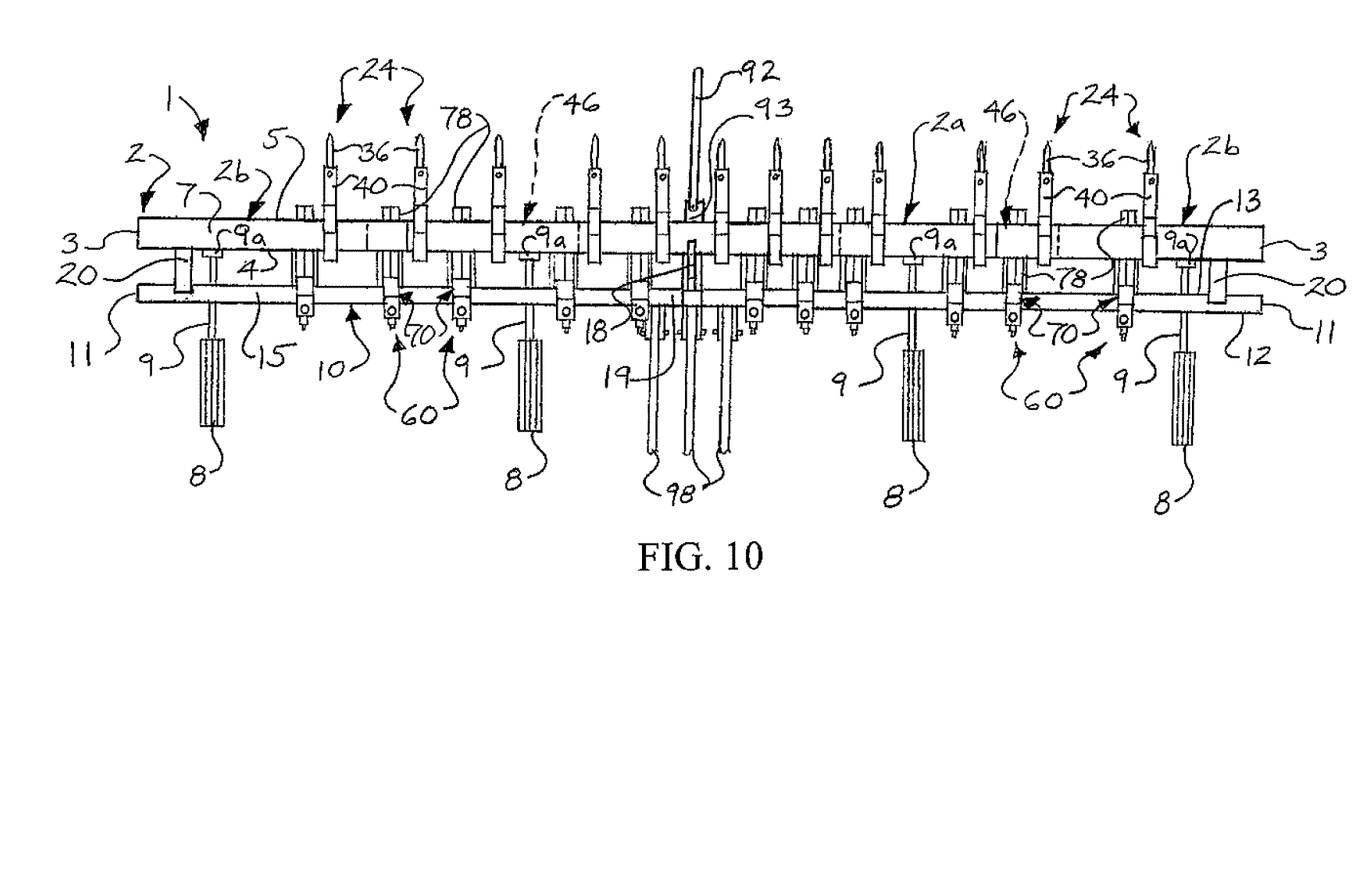
FIG. 10 is a top view of an illustrative plow and fertilizer apparatus with multiple furrow plow assemblies mounted on the main apparatus beam and multiple fertilizer coulter assemblies mounted on the coulter assembly mount beam in front of the main apparatus beam.

Referring next to FIGS. 3-10 of the drawings, the main apparatus beam 2 of the plow and fertilizer apparatus 1 may have a pair of opposite apparatus beam ends 3, as particularly illustrated in FIG. 10. A front apparatus beam surface 4, a rear apparatus beam surface 5, a lower apparatus beam surface 6 and an upper apparatus beam surface 7 may extend between the apparatus beam ends 3 of the main apparatus beam 2. As illustrated in FIGS. 4 and 10, multiple apparatus wheels 8 may be mounted on the main apparatus beam 2 typically via respective wheel mount frames 9. The wheel mount frames 9 may be welded, bolted and/or otherwise attached to the rear apparatus beam surface 5 of the main apparatus beam 2 using suitable wheel mount brackets 9a (FIGS. 9 and 10), mechanical fasteners and the like according to the knowledge of those skilled in the art.

Figure 7:
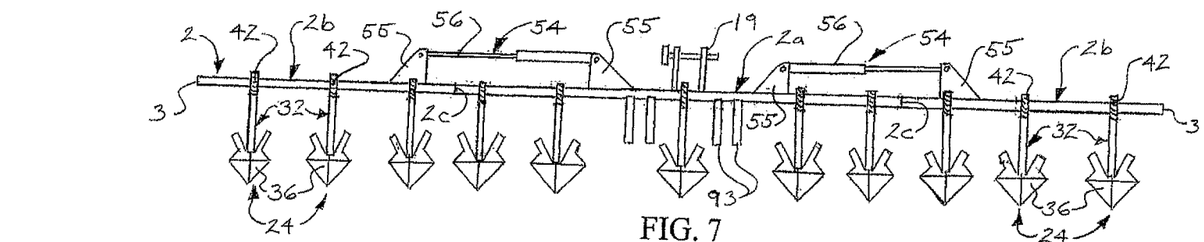
FIG. 7 is a rear view of multiple furrow plow assemblies mounted on the main apparatus beam of an illustrative plow and fertilizer apparatus, with the fertilizer coulter assemblies (not illustrated) detached from the apparatus.

As illustrated in FIGS. 7-9, in some embodiments, the main apparatus beam 2 may include a center beam segment 2a. A pair of wing segments 2b may be pivotally mounted to opposite ends of the center beam segment 2a at respective wing hinges 2c. Accordingly, the wing segments 2b may be capable of pivoting upwardly relative to the center beam segment 2a at the respective wing hinges 2c. A pair of wing cylinder assemblies 54 for the respective wing segments 2b may be provided on the upper apparatus beam surface 7 of the main apparatus beam 2. The wing cylinder assemblies 54 may include a pair of wing cylinder flanges 55 provided on the center beam segment 2a and the corresponding wing segment 2b, respectively. A typically hydraulic wing cylinder 56 may engage the wing cylinder flanges 55. Accordingly, operation of the wing cylinders 56 may facilitate selective raising and lowering of the wing segments 2b with respect to the center beam segment 2a at the respective wing hinges 2c, as is known by those skilled in the art. The wing cylinder assemblies 54 are omitted from FIGS. 3-6 for brevity.

An elongated coulter assembly mount beam 10 is provided on the main apparatus beam 2. The coulter assembly mount beam 10 may be disposed in generally adjacent and spaced-apart relationship to the front apparatus beam surface 4 of the main apparatus beam 2. As illustrated in FIG. 10, a longitudinal axis of the coulter assembly mount beam 10 may be disposed in generally parallel and spaced-apart relationship to a longitudinal axis of the main apparatus beam 2, and the coulter assembly mount beam 10 may be generally co-extensive with the main apparatus beam 2. As illustrated in FIGS. 3 and 10, the coulter assembly mount beam 10 may have a pair of opposite mount beam ends 11. A front mount beam surface 12, a rear mount beam surface 13, a lower mount beam surface 14 and an upper mount beam surface 15 may extend between the mount beam ends 11. The coulter assembly mount beam 10 may be attached to the main apparatus beam 2 according to any suitable technique known by those skilled in the art. In some embodiments, at least one mount beam bracket 20 may attach the coulter assembly mount beam 10 to the front apparatus beam surface 4 of the main apparatus beam 2. The mount beam brackets 20 may be bolted, welded and/or otherwise attached to the rear mount beam surface 13 of the coulter assembly mount beam 10 and to the front apparatus beam surface 4 of the main apparatus beam 2 according to the knowledge of those skilled in the art. In some embodiments, the coulter assembly mount beam 10 may have a multi-segmented and hinged construction similar to that of the center beam segment 2a and the wing segments 2b of the main apparatus beam 2 which was heretofore described with respect to FIGS. 7-9. Accordingly, folding or pivoting of the main apparatus beam 2 by actuation of the wing cylinder assemblies 54 may facilitate corresponding folding and pivoting of the coulter assembly mount beam 10.

Figure 6:
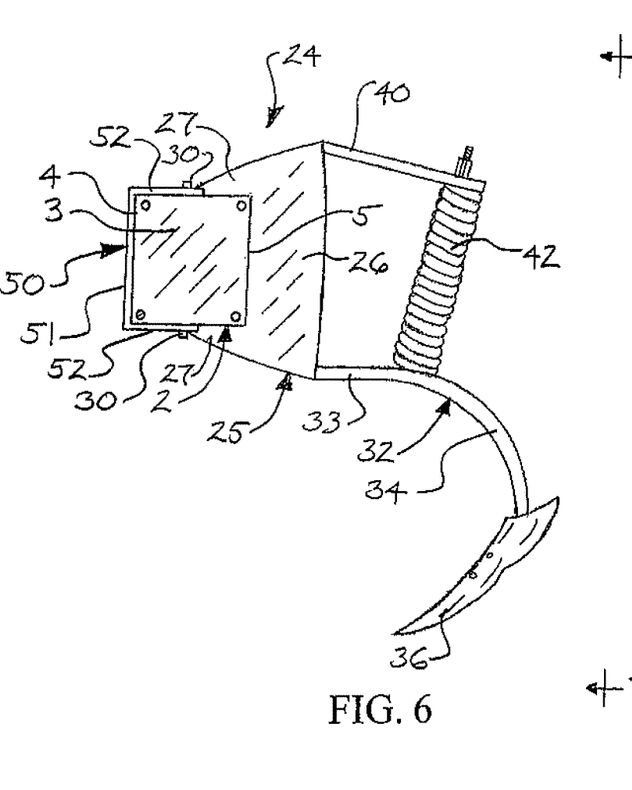
FIG. 6 is a side view of a typical furrow plow assembly attached to the main apparatus beam, with the fertilizer coulter assembly (not illustrated) detached from the coulter assembly mount beam of the apparatus.

As further illustrated in FIGS. 3 and 6, each furrow plow assembly 24 of the plow and fertilizer apparatus 1 may include a generally elongated furrow plow arm 32 which may be attached to the main apparatus beam 2 typically in a manner which will be hereinafter described. The furrow plow arm 32 may include a generally elongated and straight proximal arm segment 33 which extends rearwardly from the main apparatus beam 2. A generally elongated and curved distal arm segment 34 may extend downwardly and rearwardly from the proximal arm segment 33. A furrow plow blade 36 may terminate the lower or distal end of the distal arm segment 34 and may be attached thereto using mechanical fasteners and/or other attachment technique known by those skilled in the art. The furrow plow blade 36 of each furrow plow assembly 24 may have a standard or conventional design which is known by those skilled in the art.

As further illustrated in FIGS. 3 and 6, in some embodiments, a shock absorber mount arm 40 may be supported by the main apparatus beam 2 typically in a manner which will be hereinafter described. The shock absorber mount arm 40 may be disposed in spaced-apart relationship to the proximal arm segment 33 of the furrow plow arm 32. At least one shock absorber 42 may extend between the proximal arm segment 33 of the furrow plow arm 32 and the shock absorber mount arm 40. The shock absorber 42 may be attached to the shock absorber mount arm 40 via a shock absorber fastener 43 which is secured by a nut 44. The shock absorber 42 may be attached to the proximal arm segment 33 of the furrow plow arm 32 in a similar manner.

The furrow plow arm 32 of each furrow plow assembly 24 may be mounted on the main apparatus beam 2 according to any suitable technique which is known by those skilled in the art. As illustrated in FIGS. 3, 4 and 6, in some embodiments, each furrow plow assembly 24 may include a furrow plow assembly mount bracket 25 which is attached to the main apparatus beam 2 according to the knowledge of those skilled in the art. The proximal arm segment 33 of the furrow plow arm 32 and the shock absorber mount arm 40 may extend from the furrow plow assembly mount bracket 25. The furrow plow assembly mount bracket 25 may include a mount bracket body 26 and a pair of spaced-apart mount bracket arms 27 which extend from the mount bracket body 26. An apparatus beam cavity 28 may be formed by and between the mount bracket body 26 and the mount bracket arms 27. The apparatus beam cavity 28 may be sized and configured to receive the main apparatus beam 2 with the mount bracket body 26 engaging the rear apparatus beam surface 5 and the mount bracket arms 27 engaging the respective lower apparatus beam surface 6 and upper apparatus beam surface 7 of the main apparatus beam 2, as illustrated in FIGS. 4 and 6.

The furrow plow assembly mount bracket 25 may be attached to the main apparatus beam 2 according to any suitable technique which is known by those skilled in the art. As illustrated in FIG. 3, in some embodiments, bracket fasteners 30 may be threaded through respective bracket fastener openings (not illustrated) provided in the respective mount bracket arms 27 and into engagement with the lower apparatus beam surface 6 and the upper apparatus beam surface 7, respectively, of the main apparatus beam 2. In some embodiments, a furrow plow assembly securing component 50 may receive the main apparatus beam 2 to complement and engage the furrow plow assembly mount bracket 25 and secure each furrow plow assembly 24 on the main apparatus beam 2. Accordingly, each furrow plow assembly 24 may be selectively mounted at any desired position along the length of the main apparatus beam 2, and at a selected spacing interval relative to the adjacent furrow plow assemblies 24, by sliding or positioning the furrow plow assembly mount bracket 25 to the selected location or position along the main apparatus beam 2 and securing the furrow assembly mount bracket 25 to the main apparatus beam 2 by deployment of the furrow plow assembly securing component 50. Alternative techniques known by those skilled in the art may be used to mount the furrow plow assembly mount bracket 25 on the main apparatus beam 2.

As illustrated in FIG. 3, the furrow plow assembly securing component 50 may include a securing component body 51 which engages the front apparatus beam surface 4 and a pair of spaced-apart securing component arms 52 which extend from the securing component body 51 and engage the respective lower apparatus beam surface 6 and upper apparatus beam surface 7. In some embodiments, the furrow plow assembly securing component 50 may include a standard or conventional U-bolt. The securing component arms 52 may be externally threaded to engage companion interiorly-threaded bolt openings (not illustrated), respectively, in the respective mount bracket arms 27 of the furrow plow assembly mount bracket 25 to secure the furrow plow assembly securing component 50 to the furrow plow assembly mount bracket 25 and mount the furrow plow assembly 24 on the main apparatus beam 2. In other embodiments, the furrow plow assembly securing component 50 may include a standard or conventional U-bracket in which a pair of bracket fasteners (not illustrated) may attach the furrow plow assembly securing component 50 to the main apparatus beam 2 in engagement with the furrow plow assembly mount bracket 25.

As further illustrated in FIGS. 3 and 6, each fertilizer coulter assembly 60 of the plow and fertilizer apparatus 1 may include a generally elongated coulter assembly arm 68 which may be attached to the coulter assembly mount beam 10 typically in a manner which will be hereinafter described. The coulter assembly arm 68 may extend generally downwardly and vertically from the coulter assembly mount beam 10 to the front of the main apparatus beam 2. A generally elongated coulter assembly frame 61 may extend generally horizontally from and in generally perpendicular relationship to the coulter assembly arm 68. The coulter assembly frame 61 may have a proximal frame end 62 which is attached to the coulter assembly arm 68 according to the knowledge of those skilled in the art and a distal frame end 63 which is opposite the proximal frame end 62. At least one coulter disk 78 is mounted for rotation in the coulter assembly frame 61 according to the knowledge of those skilled in the art. As illustrated in FIG. 4, in the assembled plow and fertilizer apparatus 1, the coulter disk 78 of each fertilizer coulter assembly 60 may be disposed generally beneath the main apparatus beam 2 and in front of the furrow plow blade 36 of the furrow plow assembly 24.

A fertilizer discharge tube 81 may be supported by the fertilizer coulter assembly 60 for purposes which will be hereinafter described. Accordingly, in some embodiments, a discharge tube support 66 may be provided on the distal frame end 63 of the coulter assembly frame 61 behind the coulter disk 78. The fertilizer discharge tube 81 may be supported by the discharge tube support 66. At least one fertilizer distribution tube 80 may be disposed in fluid communication with the fertilizer discharge tube 81. A fertilizer pump (not illustrated) may be disposed in fluid communication with the fertilizer distribution tube 80. In some embodiments, a clamp 64 may secure the fertilizer distribution tube 80 to the coulter assembly frame 61.

Figure 5:
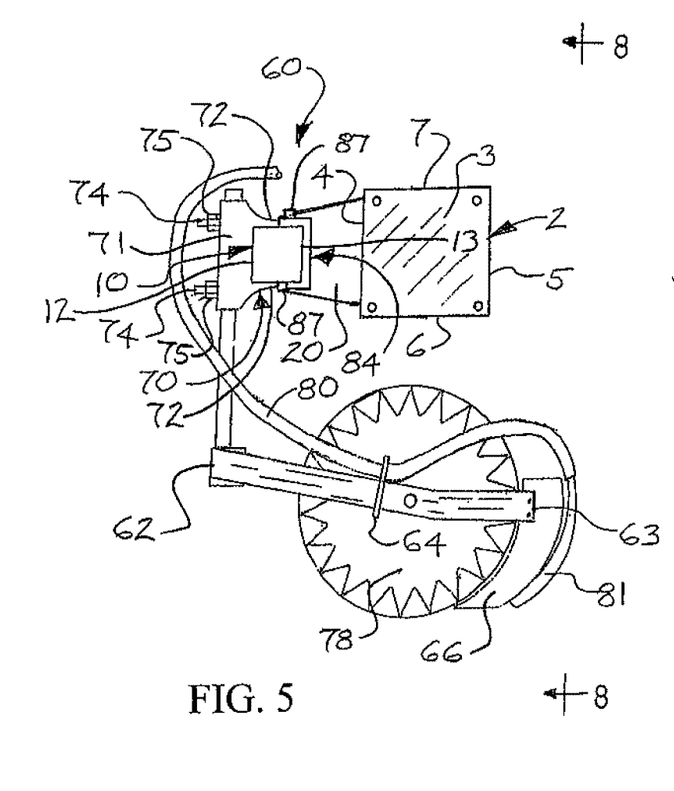
FIG. 5 is a side view of a typical fertilizer coulter assembly attached to a coulter assembly mount beam of an illustrative plow and fertilizer apparatus, with the furrow plow assembly (not illustrated) detached from a main apparatus beam of the apparatus.

The coulter assembly arm 68 of each fertilizer coulter assembly 60 may be mounted on the coulter assembly mount beam 10 according to any suitable technique which is known by those skilled in the art. As further illustrated in FIGS. 3-5, in some embodiments, each fertilizer coulter assembly 60 may include a coulter assembly mount bracket 70 which facilitates attachment of the coulter assembly arm 68 to the coulter assembly mount beam 10. The coulter assembly mount bracket 70 may include a mount bracket body 71 and a pair of spaced-apart mount bracket arms 72 which extend from the mount bracket body 71. A mount beam cavity 73 (FIG. 3) may be formed by and between the mount bracket body 71 and the mount bracket arms 72. The mount beam cavity 73 of the coulter assembly mount bracket 70 may be sized and configured to accommodate the coulter assembly mount beam 10 as the mount bracket body 71 engages the front mount beam surface 12 and the mount bracket arms 72 engage the respective lower mount beam surface 14 and upper mount beam surface 15, as illustrated in FIGS. 4 and 5.

In some embodiments, the mount bracket body 71 of the coulter assembly mount bracket 70 may be suitably configured to telescopically accommodate the coulter assembly arm 68. Arm fasteners 74 may be threaded into a pair of respective arm fastener openings (not illustrated) in the mount bracket body 71 of the coulter assembly mount bracket 70. The arm fasteners 74 may be selectively loosened to disengage from the coulter assembly arm 68 and facilitate selective vertical adjustment of the coulter assembly arm 68 in the mount bracket body 71 and selectively threaded against the coulter assembly arm 68 to secure the coulter assembly arm 68 at a selected height in the mount bracket body 71.

As further illustrated in FIG. 3, a coulter assembly securing component 84 may receive the coulter assembly mount beam 10 to complement and engage the coulter assembly mount bracket 70 and secure each fertilizer coulter assembly 60 on the coulter assembly mount beam 10. Each fertilizer coulter assembly 60 may be selectively mounted at any desired position along the length of the coulter assembly mount beam 10, and at a selected spacing interval relative to the adjacent fertilizer coulter assemblies 60, by sliding or positioning the coulter assembly mount bracket 70 to the selected location or position along the coulter assembly mount beam 10 and securing the coulter assembly mount bracket 70 to the coulter assembly mount beam 10 by deployment of the coulter assembly securing component 84. Alternative techniques known by those skilled in the art may be used to mount the coulter assembly mount bracket 70 on the coulter assembly mount beam 10.

The coulter assembly securing component 84 may include a securing component body 85 and a pair of spaced-apart securing component arms 86 which extend from the securing component body 85. In some embodiments, the coulter assembly securing component 84 may include a standard or conventional U-bolt. The securing component arms 86 may be externally threaded to engage companion interiorly-threaded bolt openings (not illustrated) in the respective mount bracket arms 72 of the coulter assembly mount bracket 70 to secure the coulter assembly securing component 84 to the coulter assembly mount bracket 70 and mount the coulter assembly arm 68 on the coulter assembly mount beam 10. In other embodiments, the coulter assembly securing component 84 may include a standard or conventional U-bracket in which a pair of bracket fasteners 87 may attach the coulter assembly securing component 84 to the coulter assembly mount beam 10 in engagement with the coulter assembly mount bracket 70. Accordingly, the coulter assembly securing component 84 may receive the coulter assembly mount beam 10 with the securing component body 85 engaging the rear mount beam surface 13 and the securing component arms 86 engaging the respective lower mount beam surface 14 and upper mount beam surface 15 of the coulter assembly mount beam 10.

Figure 2:
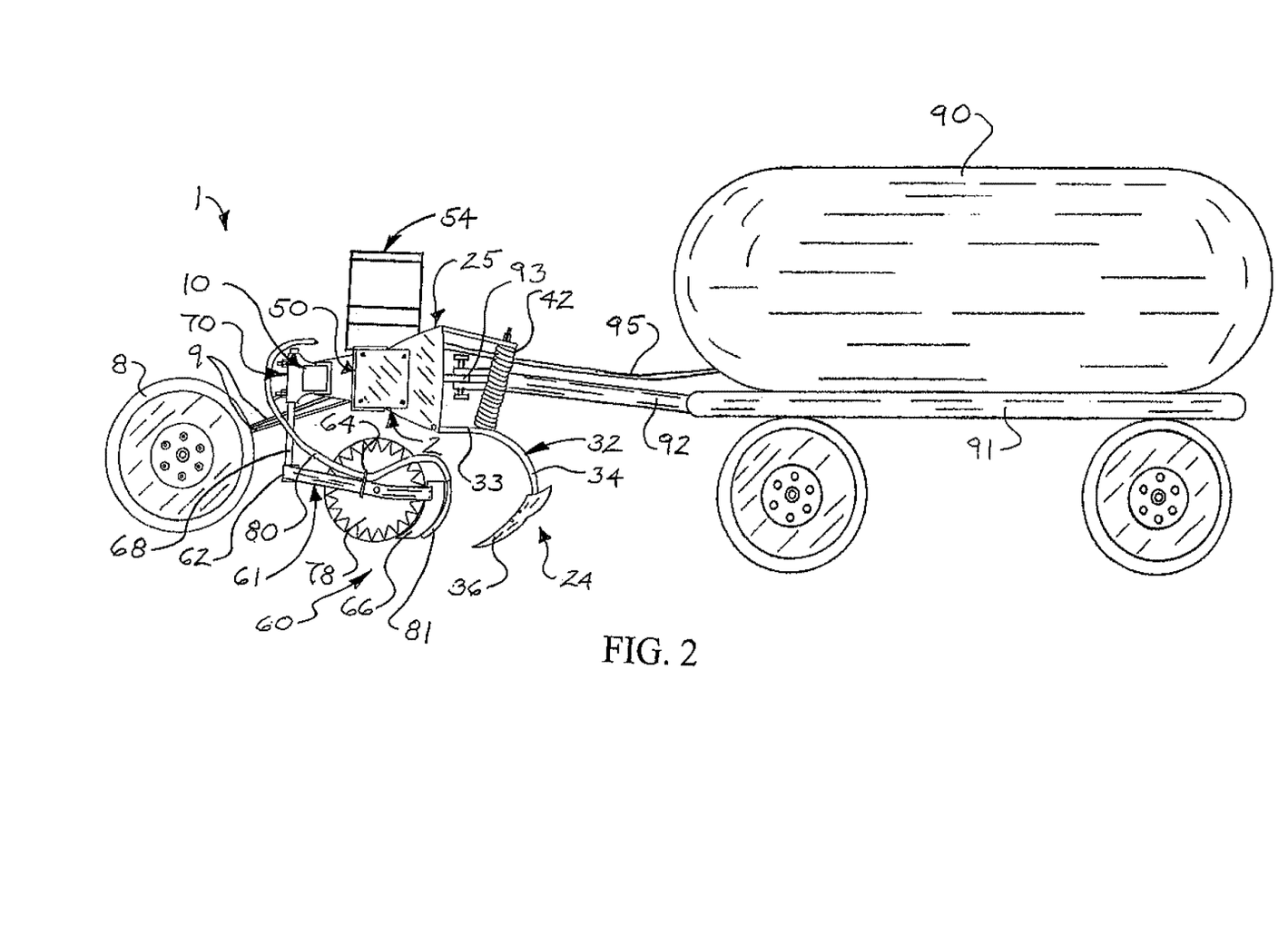
FIG. 2 is a side view of an illustrative plow and fertilizer apparatus with the fertilizer tank trailer coupled to the apparatus.

The fertilizer tank 90 (FIGS. 1 and 2) contains a supply of typically liquid fertilizer 94 (FIG. 11) and may be disposed in fluid communication with the fertilizer pump (not illustrated) through a tank outlet conduit 95 (FIGS. 1 and 2). In some embodiments, the fertilizer pump may be drivingly coupled to one of the apparatus wheels 8 (FIG. 4), typically through a chain and sprocket drive train (not illustrated), for example and without limitation, for operation of the fertilizer pump in pumping of the fertilizer 94 from the fertilizer tank 90 through the tank outlet conduit 95 and the fertilizer distribution tubes 80, respectively, and discharge of the fertilizer 94 from the fertilizer discharge tube 81 into the furrow 101, as illustrated in FIG. 11 and will be hereinafter described. In other embodiments, the fertilizer pump may be a standard or conventional, hydraulically-operated fertilizer pump known by those skilled in the art.

As illustrated in FIG. 10, a tractor hitch coupling 18 may be provided on the main apparatus beam 2. A three-point hitch coupling extension 19 may be coupled to the tractor hitch coupling 18. Multiple tractor hitch connecting members 98 may be coupled to the hitch coupling extension 19 such as by using coupling pins (not illustrated) or other standard or conventional technique known by those skilled in the art. As illustrated in FIG. 1, the tractor hitch connecting members 98 may be coupled to the tractor hitch 97 on the tractor 96 typically in the conventional manner. As further illustrated in FIG. 10, a tank coupling hitch 93 may be provided on the main apparatus beam 2. At least one tank coupling tongue 92 may be coupled to the tank coupling hitch 93 typically in the conventional manner. As illustrated in FIGS. 1 and 2, the fertilizer tank trailer 91 of the fertilizer tank 90 may be coupled to the tank coupling tongue 92.

As illustrated in FIG. 11, in typical application of the plow and fertilizer apparatus 1, the tractor 96 (FIG. 1) is operated to tow the plow and fertilizer apparatus 1 and the fertilizer tank 90 on soil 100. The coulter disk 78 of each fertilizer coulter assembly 60 forms a furrow 101 in the soil 100. Simultaneously, liquid fertilizer 94 is pumped from the fertilizer tank 90 through the tank outlet conduit 95 (FIG. 2) and the fertilizer distribution tube 80, respectively, and is discharged from the fertilizer discharge tube 81 into the furrow 101 behind the coulter disk 78. The furrow plow blade 36 of the furrow plow assembly 24 agitates, oxygenates and mixes the liquid fertilizer 94 with the broken-up soil 100 in the furrow 101, forming plowed soil 102 in the furrow 101 behind the furrow plow blade 36. Planting of crops in the plowed soil 102 may follow using planting equipment typically in the conventional manner.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. A plow and fertilizer apparatus, comprising:
an elongated main apparatus beam having a front apparatus beam surface and a rear apparatus beam surface;
a plurality of furrow plow assemblies carried by the elongated main apparatus beam, each of the plurality of furrow plow assemblies including:
a furrow plow assembly mount bracket engaging the rear apparatus beam surface of the main apparatus beam;
a furrow plow arm carried by the furrow plow assembly mount bracket; and
a furrow plow blade carried by the furrow plow arm;
an elongated coulter assembly mount beam carried by the elongated main apparatus beam and disposed in generally adjacent and spaced-apart relationship to the front apparatus beam surface of the main apparatus beam; and
a plurality of fertilizer coulter assemblies carried by the elongated coulter assembly mount beam in generally aligned or registering relationship to the plurality of furrow plow assemblies, respectively, each of the plurality of fertilizer coulter assemblies including:
a coulter assembly arm carried by the elongated coulter assembly mount beam; and
at least one coulter disk carried by the coulter assembly arm;
a plurality of fertilizer discharge tubes carried by the plurality of fertilizer coulter assemblies, respectively; and
at least one fertilizer distribution tube disposed in fluid communication with the plurality of fertilizer discharge tubes.

2. The plow and fertilizer apparatus of claim 1 further comprising a shock absorber mount arm carried by the elongated main apparatus beam and at least one shock absorber extending between the shock absorber mount arm and the furrow plow arm of each of the plurality of furrow plow assemblies.

3. The plow and fertilizer apparatus of claim 1 wherein each of the plurality of fertilizer coulter assemblies comprises a coulter assembly frame carried by the coulter assembly arm, and wherein the at least one coulter disk is carried by the coulter assembly frame.

4. The plow and fertilizer apparatus of claim 3 further comprising a fertilizer discharge tube support carried by the coulter assembly frame, and wherein each of the plurality of fertilizer discharge tubes is carried by the fertilizer discharge tube support of each corresponding one of the plurality of fertilizer coulter assemblies.

5. The plow and fertilizer apparatus of claim 1 further comprising at least one mount beam bracket attaching the elongated coulter assembly mount beam to the elongated main apparatus beam.

6. The plow and fertilizer apparatus of claim 1 further comprising a furrow plow assembly securing component carried by the elongated main apparatus beam, and wherein the furrow plow assembly securing component secures the furrow plow arm of each of the plurality of furrow plow assemblies to the furrow plow assembly mount bracket.

7. The plow and fertilizer apparatus of claim 1 further comprising a coulter assembly mount bracket and a coulter assembly securing component carried by the elongated coulter assembly mount beam, and wherein the coulter assembly arm of each of the plurality of fertilizer coulter assemblies is carried by the coulter assembly mount bracket.

8. The plow and fertilizer apparatus of claim 7 wherein the coulter assembly mount bracket telescopically accommodates the coulter assembly arm.

9. A plow and fertilizer apparatus, comprising:
an elongated main apparatus beam having a front apparatus beam surface and a rear apparatus beam surface;
a plurality of furrow plow assemblies carried by the elongated main apparatus beam, each of the plurality of furrow plow assemblies including:
a furrow plow assembly mount bracket carried by the elongated main apparatus beam and engaging the rear apparatus beam surface of the main apparatus beam;
a furrow plow arm carried by the furrow plow assembly mount bracket; and
a furrow plow blade carried by the furrow plow arm;
an elongated coulter assembly mount beam carried by the elongated main apparatus beam, the elongated coulter assembly mount beam parallel and spaced-apart to the front apparatus beam surface of the elongated main apparatus beam; and
a plurality of fertilizer coulter assemblies carried by the elongated coulter assembly mount beam, each of the plurality of fertilizer coulter assemblies including:
a coulter assembly mount bracket carried by the elongated coulter assembly mount beam;
a coulter assembly arm carried by the coulter assembly mount bracket;
a coulter assembly frame carried by the coulter assembly arm; and
at least one coulter disk carried by the coulter assembly frame;
a plurality of fertilizer discharge tubes carried by the coulter assembly frame of each of the plurality of fertilizer coulter assemblies; and
at least one fertilizer distribution tube disposed in fluid communication with the plurality of fertilizer discharge tubes.

10. The plow and fertilizer apparatus of claim 9 further comprising a shock absorber mount arm carried by the furrow plow assembly mount bracket and at least one shock absorber extending between the shock absorber mount arm and the furrow plow arm of each of the plurality of furrow plow assemblies.

11. The plow and fertilizer apparatus of claim 9 further comprising a fertilizer discharge tube support carried by the coulter assembly frame of each of the plurality of fertilizer coulter assemblies, and wherein the fertilizer discharge tube is carried by the fertilizer discharge tube support.

12. The plow and fertilizer apparatus of claim 9 further comprising at least one mount beam bracket attaching the elongated coulter assembly mount beam to the elongated main apparatus beam.

13. The plow and fertilizer apparatus of claim 9 further comprising a furrow plow assembly securing component securing each of the plurality of furrow plow assemblies to the elongated main apparatus beam.

14. The plow and fertilizer apparatus of claim 9 further comprising a coulter assembly securing component securing each of the plurality of fertilizer coulter assemblies to the elongated coulter assembly mount beam.

15. The plow and fertilizer apparatus of claim 9 wherein the elongated main apparatus beam comprises a center beam segment and a pair of wing segments pivotally carried by the center beam segment.

16. A plow and fertilizer apparatus, comprising:
an elongated main apparatus beam having a front apparatus beam surface and a rear apparatus beam surface;
a plurality of furrow plow assemblies carried by and adjustable in position along the elongated main apparatus beam, each of the plurality of furrow plow assemblies including:
a furrow plow assembly mount bracket carried by the elongated main apparatus beam and engaging the rear apparatus beam surface of the main apparatus beam;
a furrow plow assembly securing component carried by the elongated main apparatus beam and engaging the furrow plow assembly mount bracket;
a furrow plow arm having a generally straight proximal arm segment carried by the furrow plow assembly mount bracket and a curved distal arm segment extending from the proximal arm segment; and
a furrow plow blade carried by the distal arm segment of the furrow plow arm;
at least one mount beam bracket carried by the elongated main apparatus beam;
an elongated coulter assembly mount beam carried by the at least one mount beam bracket, the elongated coulter assembly mount beam parallel and spaced-apart to the front apparatus beam surface of the elongated main apparatus beam; and
a plurality of fertilizer coulter assemblies carried by and adjustable in position along the elongated coulter assembly mount beam, each of the plurality of fertilizer coulter assemblies including:
a coulter assembly mount bracket carried by the elongated coulter assembly mount beam;
a coulter assembly securing component carried by the elongated coulter assembly mount beam and engaging the coulter assembly mount bracket;
a coulter assembly arm carried by the coulter assembly mount bracket;
a coulter assembly frame carried by the coulter assembly arm; and
at least one coulter disk carried by the coulter assembly frame;
a plurality of fertilizer discharge tubes carried by the coulter assembly frame of each of the plurality of fertilizer coulter assemblies; and
at least one fertilizer distribution tube disposed in fluid communication with the plurality of fertilizer discharge tubes.

17. The plow and fertilizer apparatus of claim 16 further comprising a shock absorber mount arm carried by the furrow plow assembly mount bracket and at least one shock absorber extending between the shock absorber mount arm and the furrow plow arm of each of the plurality of furrow plow assemblies.

18. The plow and fertilizer apparatus of claim 16 further comprising a fertilizer discharge tube support carried by the coulter assembly frame of each of the plurality of fertilizer coulter assemblies, and wherein the fertilizer discharge tube is carried by the fertilizer discharge tube support.

19. The plow and fertilizer apparatus of claim 16 wherein the elongated main apparatus beam comprises a center segment and a pair of wing segments pivotally carried by the center segment.

20. The plow and fertilizer apparatus of claim 16 wherein the elongated main apparatus beam comprises a center beam segment and a pair of wing segments pivotally carried by the center beam segment.

* * * * *